(12) United States Patent
Doyden et al.

(10) Patent No.: US 9,967,551 B2
(45) Date of Patent: May 8, 2018

(54) METHOD FOR DISPLAYING A 3D CONTENT ON A MULTI-VIEW DISPLAY DEVICE, CORRESPONDING MULTI-VIEW DISPLAY DEVICE AND COMPUTER PROGRAM PRODUCT

(71) Applicant: THOMSON LICENSING, Issy de Moulineaux (FR)

(72) Inventors: Didier Doyden, La Bouexiere (FR); Sylvain Thiebaud, Noyal sur Vilaine (FR)

(73) Assignee: THOMSON LICENSING, Issy les Moulineaux (FR)

( * ) Notice: Subject to any disclaimer, the term of this patent is extended or adjusted under 35 U.S.C. 154(b) by 244 days.

(21) Appl. No.: 14/620,670

(22) Filed: Feb. 12, 2015

(65) Prior Publication Data

US 2015/0237332 A1 Aug. 20, 2015

(30) Foreign Application Priority Data

Feb. 14, 2014 (EP) .................................. 14305191

(51) Int. Cl.
*H04N 13/04* (2006.01)
*G06T 15/00* (2011.01)
*G06F 13/00* (2006.01)

(52) U.S. Cl.
CPC ..... *H04N 13/0402* (2013.01); *H04N 13/0445* (2013.01); *G06F 13/00* (2013.01); *G06T 15/00* (2013.01)

(58) Field of Classification Search
CPC ........ H04N 13/00; H04N 13/18; H04N 13/22; H04N 13/48; H04N 13/0402; G06T 15/10
See application file for complete search history.

(56) References Cited

U.S. PATENT DOCUMENTS

2005/0190180 A1* 9/2005 Jin ..................... H04N 13/0018
  345/419
2012/0229604 A1* 9/2012 Boyce ................ H04N 13/0048
  348/43

(Continued)

FOREIGN PATENT DOCUMENTS

EP       1519582        3/2005
WO    WO2011062572      5/2011

OTHER PUBLICATIONS

Park et al: "Interactive Multi-View Video Adaptation for 3DTV"; 3DTV Conference: The True Vision—Capture, Transmission and Display of 3D Video, 2008, IEEE, May 28, 2008 (May 28, 2008), pp. 89-92.

(Continued)

*Primary Examiner* — Sathyanaraya V Perungavoor
*Assistant Examiner* — Patricia I Young
(74) *Attorney, Agent, or Firm* — Meagher Emanuel Laks Goldberg & Liao, LLP

(57) ABSTRACT

In one embodiment, it is proposed a method for displaying a 3D content on a multi-view display device, said multi-view display device being able to display k-views, with k an integer greater or equal to two, said method being implemented on said multi-view display device. Such method is remarkable in that it comprises:

obtaining a user's input being a depth level and/or a viewpoint;

modifying said user's input in function of at least one configuration parameter, said modifying defining a group of images, said images from said group being spatially successive images of a scene at a same time; and (Continued)

displaying k-views on said multi-view display device, said k-views being obtained from a process taking into accounts elements from said group of images.

13 Claims, 5 Drawing Sheets

(56) References Cited

U.S. PATENT DOCUMENTS

2013/0038606 A1 2/2013 Ushiki et al.
2015/0062296 A1* 3/2015 Bruls ................ H04N 13/0022
  348/43

OTHER PUBLICATIONS

Riechert et al: "Fully automatic stereo-to-multiview conversion in autostereoscopic displays"; published in the Proceedings of the Conference IBC; 2012; pp. 1-9.

Doyen et al: "Towards a Free Viewpoint and 3D Intensity Adjustment on Multi-View"; IEEE ICIP 2014; pp. 1-5.

Hoffman et al: "Vergence-accommodation conflicts hinder visual performance and cause visual fatigue"; Journal of Vision, 8(3):33, pp. 1-30, 2008.

Richards: "Steropsis and Stereoblind";Experimental Brain Research, 10, pp. 380-388, 1970.

Doyen et al: "3D intensity adjustment of a stereo content to improve Quality of Experience"; SMPTE 2nd annual conference on stereoscopic 3D for media and Entertainment, Jun. 2011; pp. 1-6

Doyen et al: "Display independent real-time multi-view rendering engine"; 18thInternational Conference on Digital Signal Processing (DSP), Jul. 2013; pp. 1-8.

ITU-R BT.2021: "Subjective methods for the assessment of stereoscopic 3DTV systems"; Radiocommunication Section of ITU; pp. 1-25.

ITU-R BT.500-11: "Methodology for the subjective assessment of the quality of television pictures"; 1974-2002; pp. 1-48.

Search Report dated Aug. 11, 2014.

* cited by examiner

METHOD FOR DISPLAYING A 3D CONTENT ON A MULTI-VIEW DISPLAY DEVICE, CORRESPONDING MULTI-VIEW DISPLAY DEVICE AND COMPUTER PROGRAM PRODUCT

This application claims the benefit, under 35 U.S.C. § 119 of European Patent Application No. 14305191.0, filed Feb. 14, 2014.

TECHNICAL FIELD

The disclosure relates to multi-view display devices that enable users to watch a 3D content without using dedicated glasses.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Figure 1:
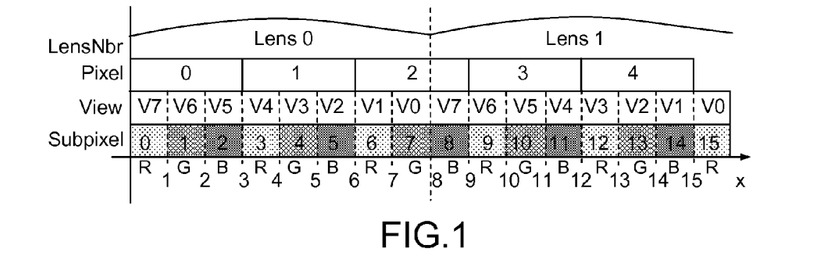
FIG. 1 presents a sectional view of a part of an auto stereoscopic display device which is an example of a multi-view display device.

An auto-stereoscopic display is a display device providing a 3D effect that can be perceived without any glasses. The simplest auto-stereoscopic display devices provide stereoscopic 3D rendering with only two views, they are based on parallax barriers. Multi-view auto-stereoscopic display devices based on lenticular network are able to generate more than 2 views to allow the viewer to be placed at different position seeing stereoscopic content. In this case, a network of lenses is added in front of the RGB sub-pixel matrix of a display. Thanks to these lenses, the light generated by the different sub-pixel R, G or B is generated in different directions, depending on the position of the sub-pixel relatively to the lens. When a user is placed in front of this display device, at a certain distance and position, he will receive on each eye only the light generated by some sub-pixels. To perceive the 3D effect without glasses, the user must receive on one eye the light of the sub-pixels generating a 3D view, and on the other eye the light of the sub-pixels generating another 3D view adjacent to the first one. The FIG. 1 presents a simple scheme of multi-view auto-stereoscopic display device generating 8 views, according to the state of the art. In this example, the red (noted R on FIG. 1) sub-pixel 0 and the blue (noted B in FIG. 1) sub-pixel 8 will generate the view V7. The green (noted G on FIG. 1) sub-pixel 1 and the red sub-pixel 9 will generate the view V6, and so on up to the view V0 generated by the green sub-pixel 7 and the red sub-pixel 15. With such a scheme, a RGB pixel generates the information corresponding to three different views.

Figure 2:
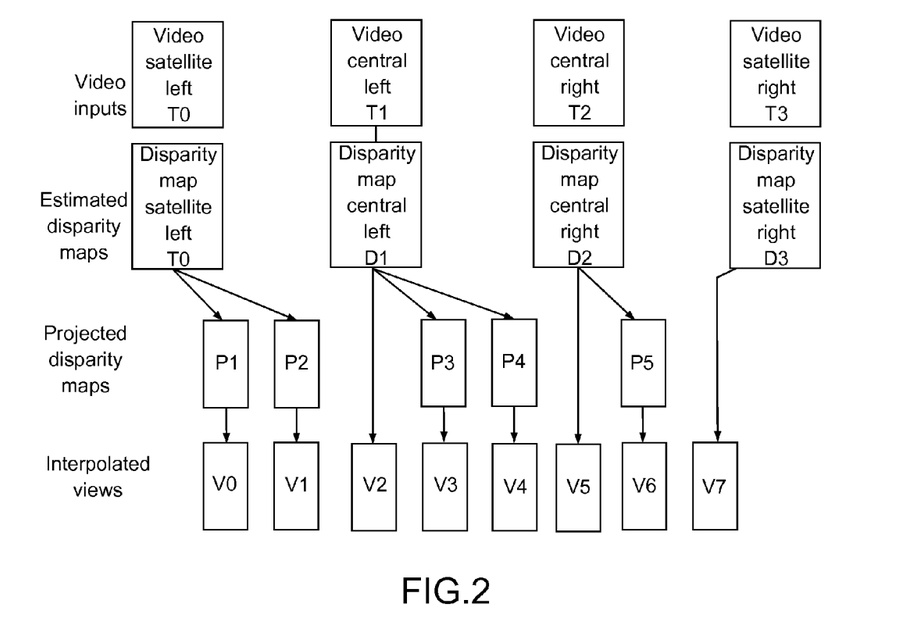
FIG. 2 presents an example of generation of eight different views from four images, corresponding to four different views (and associated disparity maps), the generation being performed by a multi-view display device which obtains (or received) the four images from another device.

A preferred scheme, disclosed in FIG. 2, is to transmit some of the views with some associated disparity maps to an auto-stereoscopic display, and then such auto-stereoscopic display interpolates the missing views in order to provide the appropriated number of views that the auto-stereoscopic display supports. At the acquisition side, if we consider a four cameras system we must then transmit four views and four associated disparity map. The display is the able to interpolate the missing views.

However, a drawback of this scheme is that the amount of data to be transmitted (e.g. the images (which are images of a same scene that were generated by several cameras positioned in several position corresponding to a view, such images being not necessarily interpolated), as well as the associated disparity maps) is quite high. Indeed, the more views the auto-stereoscopic display received from a device providing the images and the disparity maps, the heavier the bandwidth load is. Such issue can be critical in some context in which the bandwidth management is a difficult issue to handle.

In order to solve this issue, one skilled in the art would have reduced arbitrarily the number of transmitted multi-views camera images, as well as the corresponding disparity map. Then, by using a stereo-to-multiview conversion technique (as for example the one depicted in the document entitled "*Fully Automatic Conversion of Stereo to Multiview for Autostereoscopic Displays*" by C. Riechert et al., published in the proceedings of the conference IBC 2012), the auto-stereoscopic display could still display the same number of views. The reduction is set up when a monitoring of the bandwidth provides information indicating that the bandwidth is saturated (or beyond a pre-defined level). In a variant, in order to solve this issue, one skilled in the art would have reduced only the number of transmitted disparity maps, as the missing (i.e. not received) disparity maps can be computed within the auto-stereoscopic display.

The proposed technique proposes an alternative to these techniques.

SUMMARY OF THE DISCLOSURE

The present disclosure is directed to a method for displaying a 3D content on a multi-view display device, said multi-view display device being able to display k-views, with k an integer greater or equal to two. The method is implemented on said multi-view display device, and is remarkable in that it comprises:

obtaining a user's input being a depth level and/or a viewpoint;

modifying said user's input in function of at least one configuration parameter, said modifying defining a group of images, said images from said group being spatially successive images of a scene at a same time; and displaying k-views on said multi-view display device, said k-views being obtained from a process taking into accounts elements from said group of images.

Such at least one configuration parameter is a service provider's definable setting.

A user that is positioned in front of said multi-view display device can enter these user's input. When the user is in front of said multi-view display device, it means that said user is able to watch 3D content through said multi-view display device (e.g. the multi-view display device is comprised within the user's field view).

In a preferred embodiment, the method for displaying is remarkable in that said at least one configuration parameter corresponds to a bandwidth credential associated with said user.

In a preferred embodiment, the method for displaying is remarkable in that it comprises transmitting a number of images, corresponding to a cardinality of said group of images, to a device that provides said group of images to said multi-view display device.

In a preferred embodiment, the method for displaying is remarkable in that said number of images is greater or equal to three. In a preferred embodiment, the method for displaying is remarkable in that said depth level corresponds to a perceived 3D intensity parameter.

In a preferred embodiment, the method for displaying is remarkable in that said viewpoint is defined in function of a first image and a second image, said first image and second successive image belonging to said group of images.

In a preferred embodiment, the method for displaying is remarkable in that said obtaining corresponds to receiving from a device said group of images.

In a preferred embodiment, the method for displaying is remarkable in that it further comprises obtaining a group of disparity maps.

In a preferred embodiment, the method for displaying is remarkable in that said multi-view display device is an auto-stereoscopic screen.

In a preferred embodiment, the method for displaying is remarkable in that said multi-view display device is a radio communication device comprising an auto-stereoscopic screen.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component (also named hardare means) comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications.

It should also be noted that a step of obtaining an element/value in the present document can be viewed either as a step of reading such element/value in a memory unit of an electronic device or a step of receiving such element/value from another electronic device via communication means.

In another embodiment, it is proposed a multi-view display device being able to display k-views, with k an integer greater or equal to two. The multi-view display device is remarkable in that it comprises:
  means for obtaining a user's input being a depth level and/or a viewpoint;
  means for modifying said user's input in function of at least one configuration parameter, said modifying defining a group of images, said images from said group being spatially successive images of a scene at a same time;
  means for displaying k-views on said multi-view display device, said k-views being obtained from a process taking into accounts elements from said group of images.

In a variant, the multi-view display device is remarkable in that said at least one configuration parameter corresponds to a bandwidth credential associated to said user.

In a variant, the multi-view display device is remarkable in that it comprises means for transmitting a number of images, corresponding to a cardinality of said group of images, to a device that provides said group of images to said multi-view display device.

In a variant, the multi-view display device is remarkable in that said number of images is greater or equal to three.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

FIG. 1 presents a sectional view of a part of an auto stereoscopic display device, which is an example of a multi-view display device.

Usually, an auto stereoscopic display device comprises an array of pixels (which comprises pixel 0 to 4), and a lenticular array (which comprises lens 0 and lens 1) superposed to said array of pixels. Said array of pixels comprises a plurality of sub-pixels which are disposed on a substrate (not represented). Each sub-pixel is associated to a color (either green, or blue, or bleu) and to a view (due to the properties (shape, etc.) of the lenticular array. The part of an auto stereoscopic display device disclosed in FIG. 1 discloses some of these elements.

FIG. 2 presents an example of generation of eight different views from four images corresponding to four different views (and associated disparity maps), the generation being performed by a multi-view display device which obtains (or received) the four images from another device.

Usually, a multi-view display device receives several images (each of the images being associated to a view that can be for example a view corresponding to the position of a camera which was used to obtain such image; in a variant, the images are obtained from a conversion technique such as the one previously mentioned), the number of the images transmitted being defined by a service provider.

The perceived disparity on multi-view screens corresponds to the disparity between two adjacent views (these adjacent views are the views obtained after an interpolation process for example). In a k-cameras rig (generating k images at a given time), the disparity max perceived $dm_p$ can be approximated to the sum of disparity max for each pair of views divided by the number of views (noted nbv) of the display:

$$dm_p = \sum_{n=0}^{k-2} dm(n+1, n)/(nbv - 1)$$

In the context depicted in FIG. 2, the four images received by the multi-view display device, as well as the received disparity maps are used to generate eight different views via an interpolation process as know by one skilled in the state of the art.

The proposed technique enables to save some bandwidth by reducing the amount of information transmitted to a multi-view display device. Details of the proposed technique are given in the followings figures and corresponding descriptions. More precisely, with the proposed technique, a user of the multi-view display device is able to reduce such amount of information, by modifying his requirements related to the intensity of 3D to be perceived, and/or related to the views to be perceived. Moreover, in function of some parameters (such as a bandwidth credential associated to a user), these requirements are modified/adjusted. Hence, a gap between what user enters and what he gets can occur. However, the modifications induced by these modifications, are slightly perceptible.

Figure 3:
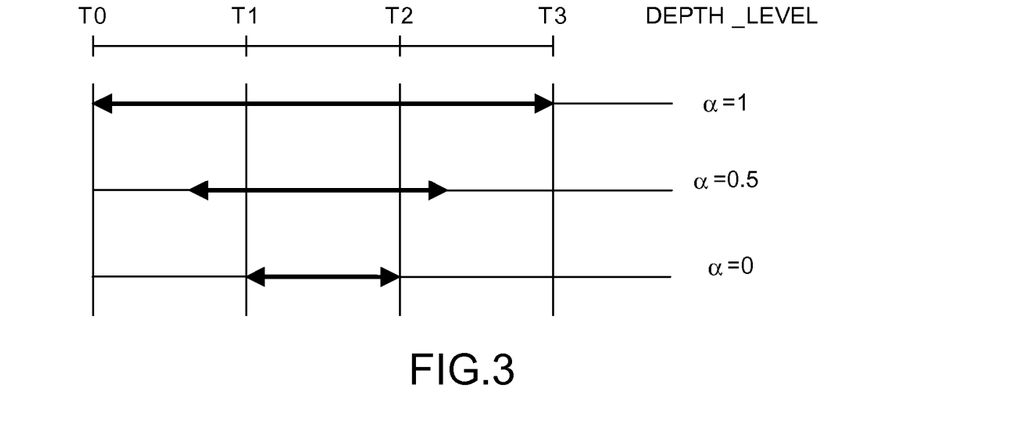
FIG. 3 illustrates different level of 3D intensity (or disparity level value, which is a parameter noted α) with a four cameras rig (which generate the views from T0 to T3) assuming that the minimum disparity is maintained, according to one embodiment of the invention.

FIG. 3 illustrates different level of 3D intensity (or even a disparity level value, which is a parameter noted α) with a four-cameras rig (which generate the views from T0 to T3) assuming that a minimum of disparity is maintained. Depending of the value of the parameter α, the number of incoming views used could differ. Then the adjusted disparity $d_{adj}$ can be expressed as:

$$d_{adj}=[dm(2,1)+\alpha(dm(3,2)+dm(1,0))]/(nbv-1)$$

With multi-view screens it is possible to see different views of the same image by slightly moving the head inside the sweet spot. In a k-cameras rig system, it could be possible to choose some specific viewpoints. A β parameter is introduced to define the viewpoint positioning compared to a central one (in such case, we have (β=0). The parameters (α,β) that are entered by a user are considered as the user's input.

Figure 4:
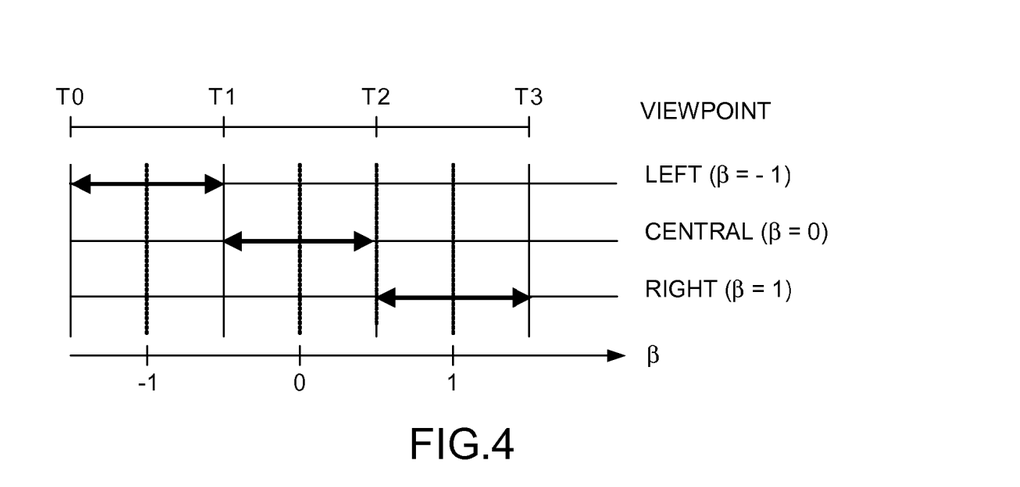
FIG. 4 illustrates the principle of an adapted viewpoint on a four cameras system, according to one embodiment of the invention.

FIG. 4 illustrates the principle of an adapted viewpoint on a four cameras system, according to one embodiment of the invention.

The LEFT case is corresponding to a multi-view content from T0-T1 with α=0 and β=−1. The CENTRAL case is corresponding to a multi-view content from T1-T2 with α=0 and β=0. The RIGHT case is corresponding to a multi-view content from T2-T3 with α=0 and β=+1.

This principle can of course be generalized to a case where more than four cameras system are used.

FIG. 5(a)-(d) present some examples of modifications of the depth level parameter and the viewpoint that are defined by a user positioned in front of a multi-view display device.

Figure 5A:
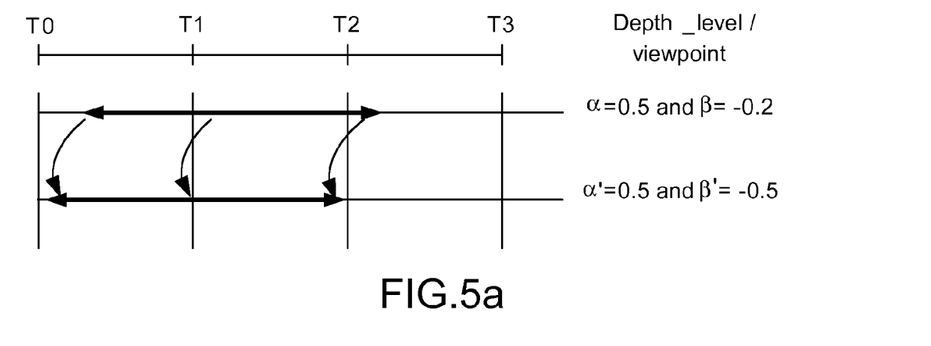
FIG. 5(a)-(d) present some examples of modifications of the depth level parameter and the viewpoint that are defined by a user positioned in front of a multi-view display device, and are modified according to several embodiments of the invention.

More precisely, the FIG. 5(a) discloses an example of a modification of a viewpoint parameter (the parameter noted β, initially at a value −0.2) initially entered by a user via a user interface either provided by a display through the multi-view display device, or a device (such as a box with a display area) connected directly or indirectly (either via wireless means or via a cable means) to the multi-view display device. In this example, the disparity level is conserved (i.e. the value of the disparity level is not modified and is equal to 0.5). The modification changes the viewpoint parameter from −0.2 to −0.5. This modification induces a save of the bandwidth of the channel that links (directly or indirectly) the multi-view display device and the provider of the multi-views camera images (which can delivers the views camera images T0, T1, T2 and T3 in this example). Indeed, in the initial configuration, it is necessary that the multi-view display device receives the four different views (as well as the associated disparity maps), however, in the modified configuration, it is not necessary to provide to the multi-view display device the view camera image T3. Therefore, around 25% of the bandwidth is saved by removing the transmission of T3. In this example, the variation of the viewpoint parameter is equal to 0.3 (where a value of one represents the distance between 2 views). For the viewpoint parameter having a range of −0.5/+0.5, it is possible to get such optimization (if we have equal distance between each camera).

Figure 5B:
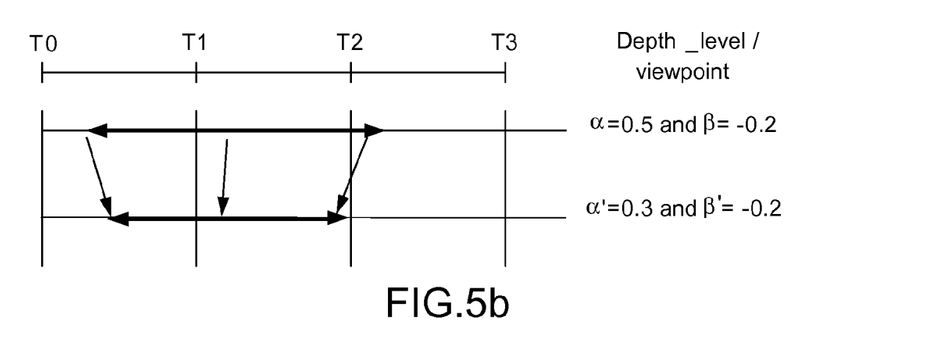

The FIG. 5(b) discloses an example of a modification of a disparity level parameter (the parameter noted α, initially at a value 0.5) initially entered by a user via a user interface either provided by a display through the multi-view display device, or a device (such as a box with a display area) connected directly or indirectly (either via wireless means or via a cable means) to the multi-view display device. In this example, the viewpoint parameter is kept (i.e. the value of the viewpoint parameter is not modified and is equal to −0.2). The modification changes the viewpoint parameter from the value 0.5 to the value 0.3. This modification induces a save of the bandwidth of the channel that links (directly or indirectly) the multi-view display device and the provider of the multi-views camera images (which can delivers the views camera images T0, T1, T2 and T3 in this example). Indeed, in the initial configuration, it is necessary that the multi-view display device receives the four different views (as well as the associated disparity maps), however, in the modified configuration, it is not necessary to provide to the multi-view display device the view camera image T3. Therefore, around 25% of the bandwidth is saved by removing the transmission of T3.

Figure 5C:
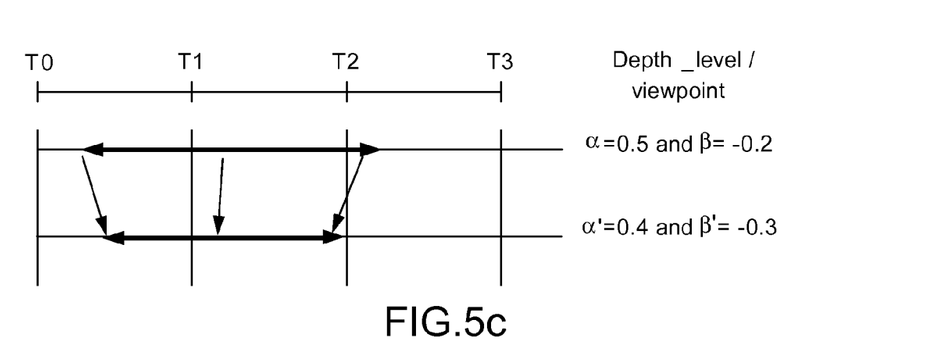

The FIG. 5(c) discloses an example of a modification of a disparity level parameter (the parameter noted α, initially at a value 0.5) and a viewpoint parameter (the parameter noted β, initially at a value −0.2), by a user via a user interface provided as explained previously. In that case, both the disparity level parameter and the viewpoint parameter are modified such that it is not necessary to transmit some views. Therefore, the user is able to modify these two parameters in such way that he fulfils the expected requirements in term of bandwidth use.

Figure 5D:
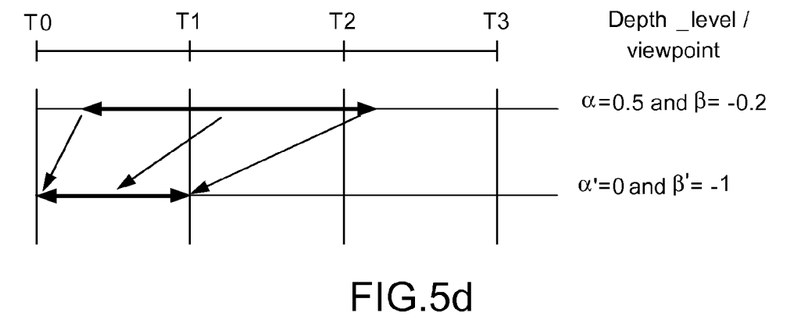

The FIG. 5(d) discloses an example of a modification of a disparity level parameter (the parameter noted α, initially at a value 0.5) and a viewpoint parameter (the parameter noted β, initially at a value −0.2), by a user via a user interface provided as explained previously. In that case, we consider a MVC-like coding where video are not encoded separately but commonly two-by-two (e.g. MVC encoding). In this case such optimization makes sense if the two adjacent views can be removed. In this case we assume that the views T0 and T1 are encoded together. Hence, by modifying the disparity level parameter to a value equaled to 0, and the viewpoint parameter to the value −1), it is possible to obtain a reduction of bandwidth equals to 50%.

More generally for any transmission scheme including at least n views (N≥3) and for a given user requirement (α,β)

with α>0 and |β|≠1, the modified values could be equal to (α',β') with α'=α−δα and β'=β+δβ for which the final number of views required is reduced by at least one: n'≤n−1 (with δα>0 and −1<δβ<1).

Figure 6:
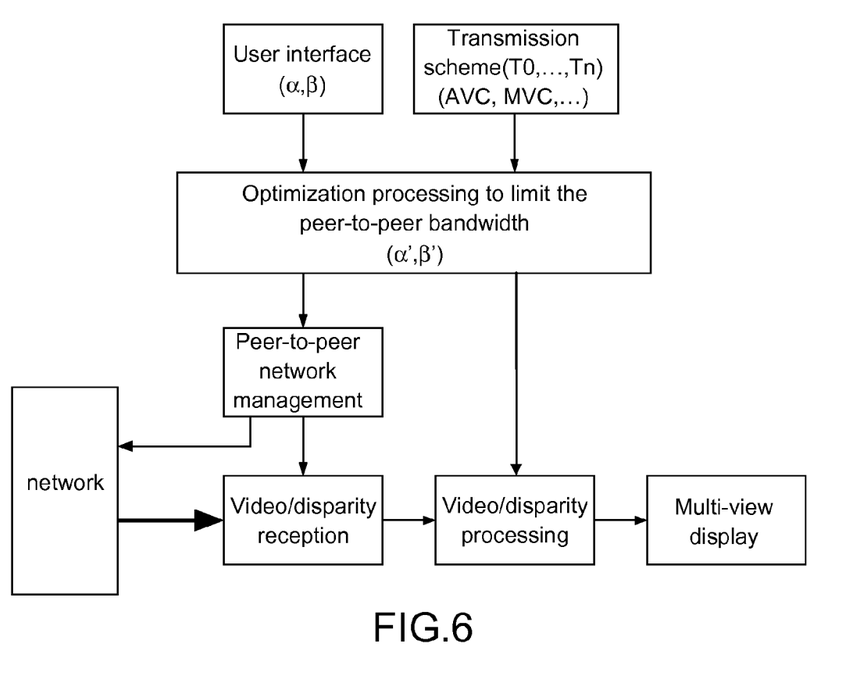
FIG. 6 presents a block diagram that focuses on some steps of the proposed technique according to one embodiment.

FIG. 6 presents a block diagram that focuses on some steps of the proposed technique according to one embodiment.

A user interface (either displayed by a multi-view display device or a device (such as a box) connected to the multi-view display device) allows the user to enter the two parameters (α,β) that are corresponding respectively to the 3D intensity and the viewpoint position. In parallel to this the system has been defined in term of number of views available. In this case we consider a view as a video and its associated disparity map that will help the renderer to interpolate missing views. In another embodiment, the two parameters (α,β) are set up according to some pre-criteria given by the user and some requirements related to bandwidth resources. Hence, based on initial (α,β) values and some requirements related to the transmission scheme (that defines the constraints on the bandwidth resources), a modified set of values (α',β') is determined to obtain a tradeoff in term of the bandwidth required and the perception requirements of the user. For example in the context of the use of a peer-to-peer network in order to provide camera images to a multi-views camera images, a management block is selecting the views really required for the processing based on the modified (α',β') values. Then the network is configured to transmit these views. They are received, processed and then displayed. In a variant, according to the terms of a user's subscription to a service provider, the modified set of values (α',β') are obtained from the user's input, as well as some bandwidth credentials/rights. For example, a user who has subscribed to a premium service could only have his parameters (α,β) slightly modified (or even not modified at all), whereas, a user having done a cheap subscription to a service, is going to have his parameters (α,β) much more modified.

Figure 7:
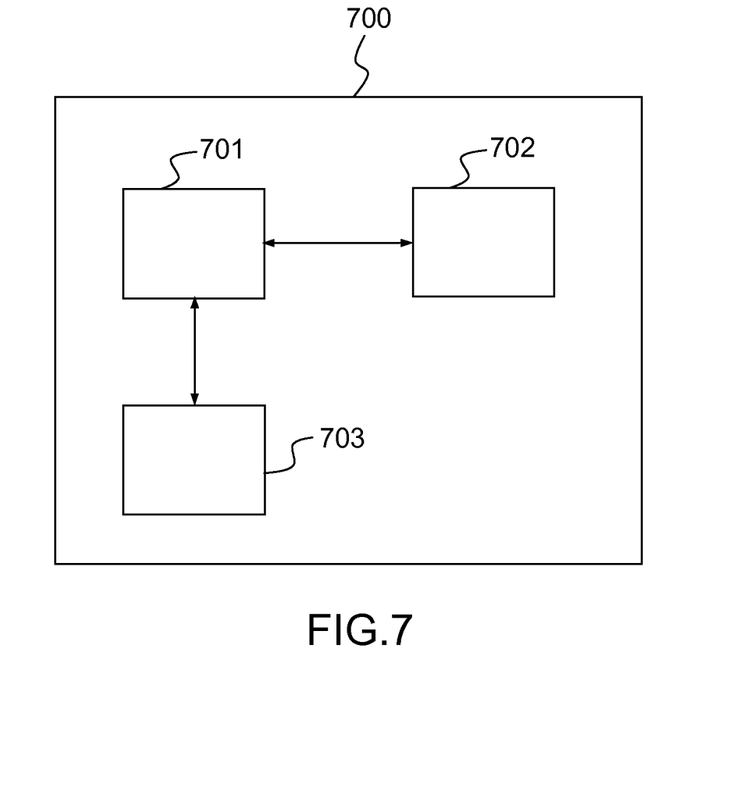
FIG. 7 presents an example device that can be used to perform one or several steps of methods disclosed in the present document.

FIG. 7 presents an example of a device that can be used to perform one or several steps of methods disclosed in the present document.

Such device can be part of a multi-view display device, or the multi-view display device itself. Such device referenced 700 comprises a computing unit (for example a CPU, for "Central Processing Unit"), referenced 701, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 702. Computer programs are made of instructions that can be executed by the computing unit. Such device 700 can also comprise a dedicated unit, referenced 703, constituting an input-output interface to allow the device 700 to communicate with other devices. In particular, this dedicated unit 703 can be connected with an antenna (in order to perform communication without contacts), or with serial ports (to carry communications "contact"). It should be noted that the arrows in FIG. 7 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 7.

The invention claimed is:

1. A method for displaying a 3D content on a multi-view display device, said multi-view display device being operable to display k-views, with k an integer greater or equal to two, said method being implemented on said multi-view display device, wherein it comprises:
   obtaining, from a user input, at least one of a depth level and a viewpoint of a scene associated with said 3D content;
   modifying said at least one of a depth level and a viewpoint of a scene obtained from said user input, the modification being based on at least a bandwidth parameter associated with said user, said modifying defining a group of images, said images from said group being spatially successive images of the scene at a same time; and
   displaying k-views of the scene on said multi-view display device, said k-views being obtained from said group of images.

2. The method for displaying according to claim 1, wherein it comprises transmitting a number of images corresponding to a cardinality of said group of images to a device that provides said group of images to said multi-view display device.

3. The method for displaying according to claim 2, wherein said number of images is greater than or equal to three.

4. The method for displaying according to claim 1, wherein said depth level corresponds to a perceived 3D intensity parameter.

5. The method for displaying according to claim 1, wherein said viewpoint is defined as a function of a first image and a second image, said first image and second image belonging to said group of images.

6. The method for displaying according to claim 1, wherein it comprises receiving from a device said group of images.

7. The method for displaying according to claim 1, wherein it further comprises obtaining a group of disparity maps.

8. The method for displaying according to claim 1, wherein said multi-view display device is an auto-stereoscopic screen.

9. The method for displaying according to claim 1, wherein said multi-view display device is a radio communication device comprising an auto-stereoscopic screen.

10. A computer-readable and non-transient storage medium storing a computer program comprising a set of computer-executable instructions to implement a method for displaying a 3D content when the instructions are executed by a computer, wherein the instructions comprise instructions, which when executed, configure the computer to perform a method for displaying a 3D content on a multi-view display device, said multi-view display device being operable to display k-views, with k an integer greater or equal to two, said method being implemented on said multi-view display device, wherein it comprises:
    obtaining, from a user input. at least one of a depth level and a viewpoint of a scene associated with said 3D content;
    modifying said at least one of a depth level and a viewpoint of a scene obtained from said user input, the modification being based on at least a bandwidth parameter associated with said user, said modifying defining a group of images, said images from said group being spatially successive images of the scene at a same time; and
    displaying k-views of the scene on said multi-view display device, said k-views being obtained from said group of images.

11. A multi-view display device being operable to display k-views, with k an integer greater or equal to two, wherein it comprises:
    at least one memory unit and a processor coupled to said at least one memory unit;
    the processor being configured to:
        obtain, from a user input, at least one of a depth level and a viewpoint of a scene associated with said 3D content;
        modify said at least one of a depth level and a viewpoint of a scene obtained from said user input, the modification being based on at least a bandwidth parameter associated with said user, said modifying defining a group of images, said images from said group being spatially successive images of the scene at a same time; and
        display k-views of the scene on said multi-view display device, said k-views being obtained from said group of images.

12. The multi-view display device according to claim 11, wherein the processor is further configured to transmit a number of images corresponding to a cardinality of said group of images to a device that provides said group of images to said multi-view display device.

13. The multi-view display device according to claim 11, wherein said number of images is greater than or equal to three.

* * * * *